Oct. 19, 1937.　　　O. T. HANDWERK　　　2,096,035
MEASURING INSTRUMENT
Filed Feb. 9, 1935　　　5 Sheets-Sheet 1

Inventor
Otto T. Handwerk
M. W. McConkey
Attorney

Oct. 19, 1937. O. T. HANDWERK 2,096,035
MEASURING INSTRUMENT
Filed Feb. 9, 1935 5 Sheets-Sheet 2
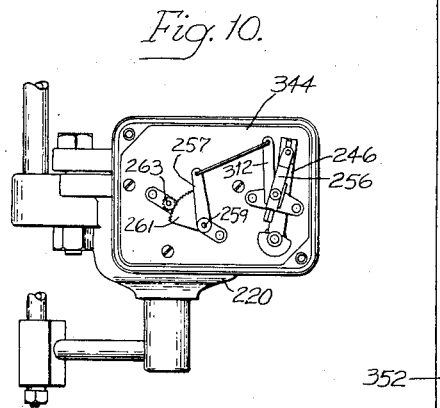
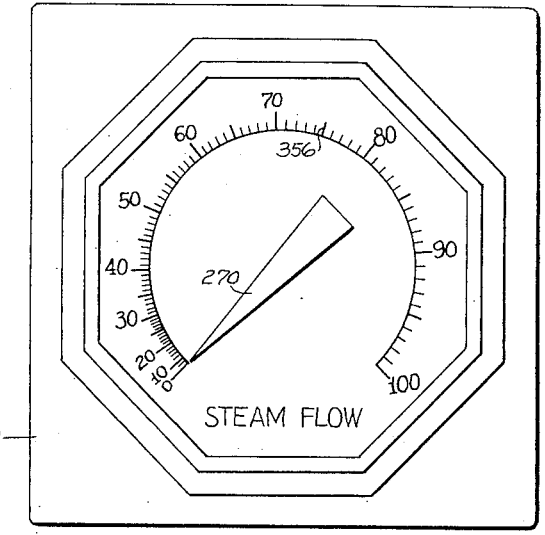
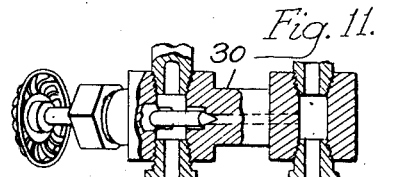
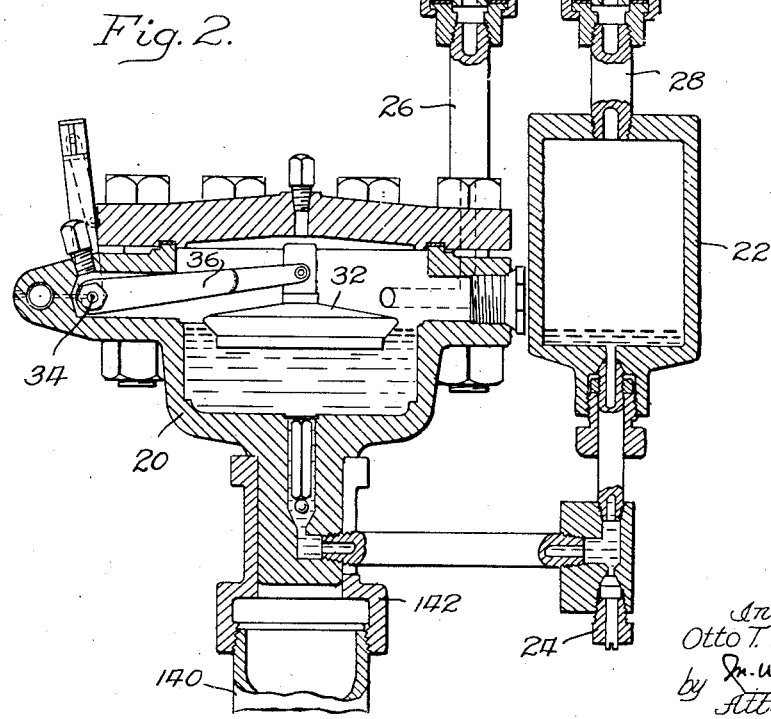
Inventor
Otto T. Handwerk
by M. W. McConkey
Attorney Oct. 19, 1937.  O. T. HANDWERK  2,096,035
MEASURING INSTRUMENT
Filed Feb. 9, 1935  5 Sheets-Sheet 3
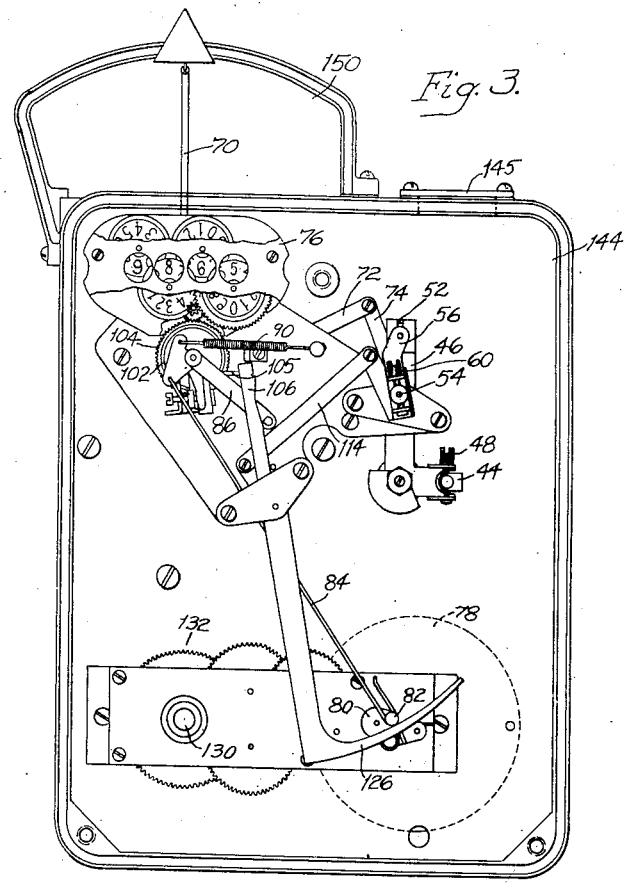
Fig. 3.
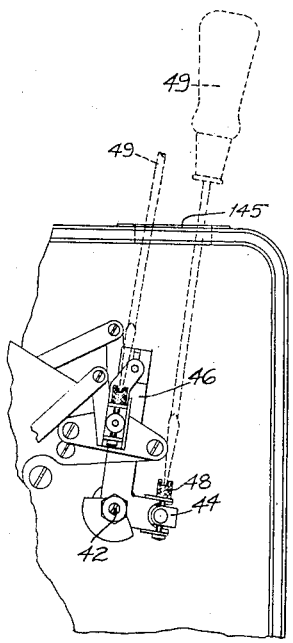
Fig. 4.
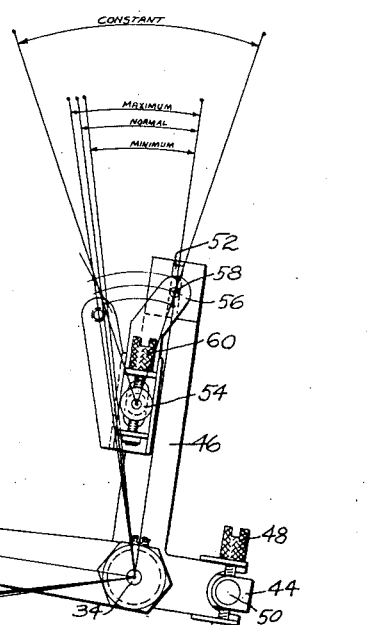
Fig. 5.
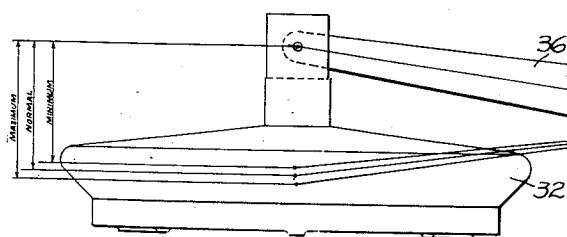
Inventor
Otto T. Handwerk
by M. W. M Tonkey
Attorney Oct. 19, 1937.     O. T. HANDWERK     2,096,035
MEASURING INSTRUMENT
Filed Feb. 9, 1935     5 Sheets-Sheet 4
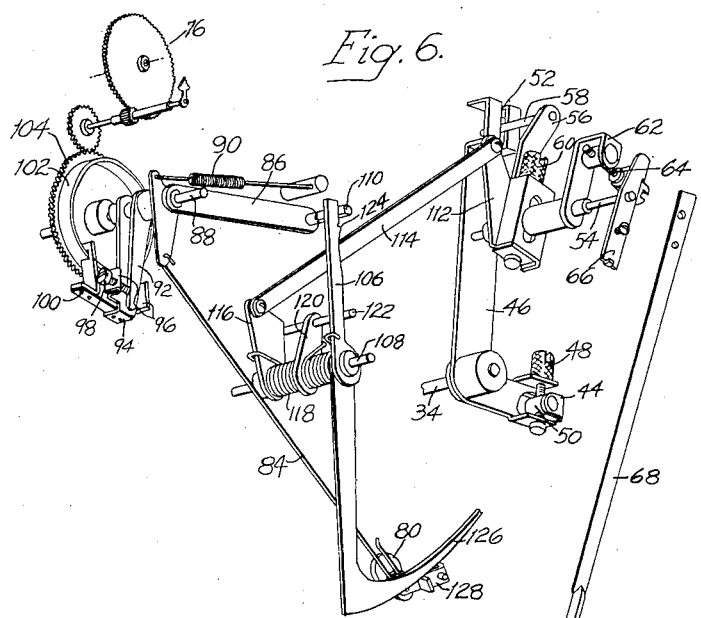
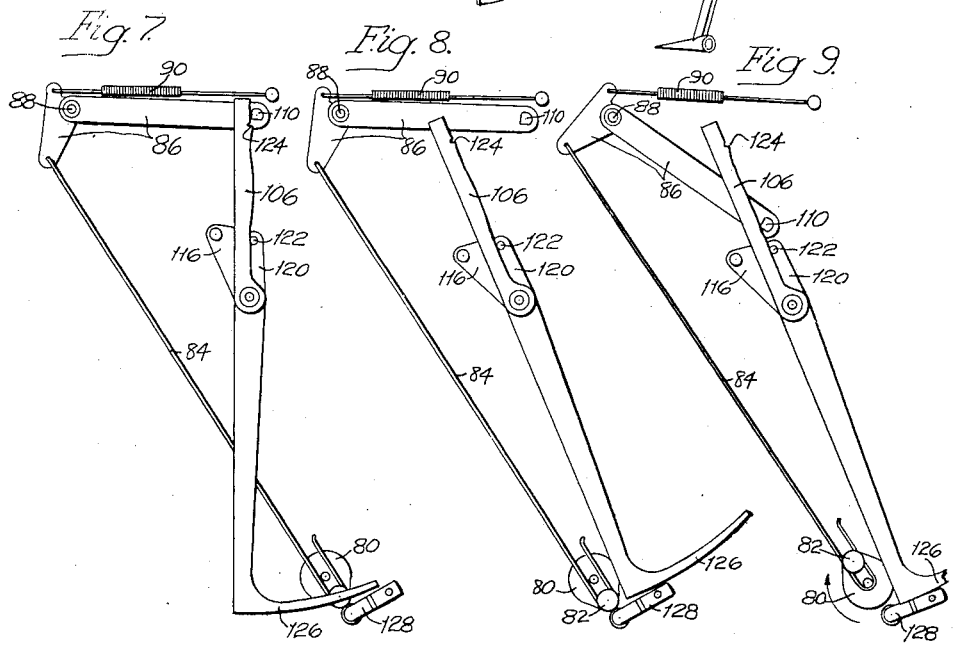
Inventor
Otto T. Handwerk
by R. W. McConkey
Attorney Oct. 19, 1937.   O. T. HANDWERK   2,096,035
MEASURING INSTRUMENT
Filed Feb. 9, 1935    5 Sheets-Sheet 5

Inventor
Otto T. Handwerk
by M. W. McConkey
Attorney

Patented Oct. 19, 1937

2,096,035

UNITED STATES PATENT OFFICE 2,096,035

MEASURING INSTRUMENT

Otto T. Handwerk, Chicago, Ill., assignor to Republic Flow Meters Company, Chicago, Ill., a corporation of Illinois Application February 9, 1935, Serial No. 5,779

5 Claims. (Cl. 73—206)

This invention relates to measuring instruments and more particularly to mechanical instruments for indicating and/or recording the flow of fluid through a conduit.

According to one desirable arrangement, a U-tube containing a column of mercury is connected across an orifice in a flow conduit so that the level of mercury in the tube will vary with changes of fluid flow. A float rests on the mercury in one leg of the U-tube and is connected by a pivoted link to a rotating shaft which extends through a novel seal to the outside of the tube.

A slotted lever is secured to this shaft outside of the casing by means of a novel adjustable connection which enables zero adjustment of the instrument. A rotatable shaft is mounted adjacent the slotted lever and carries a second lever having a pin engaging the slot so that the second lever will be driven to rotate the shaft. Suitable indicating and/or recording mechanism is connected to the shaft to be operated thereby. By this arrangement irregular rotation of the first shaft due to varying angularity of the float connecting link is compensated for and movement of the second lever and shaft is exactly proportionate to movement of the float.

The second lever is connected to its shaft by a novel adjustable mounting by which the instrument may be readily calibrated.

The above and other objects, advantages and novel features will be apparent from the following detailed description when taken in connection with the accompanying drawings showing an instrument embodying the invention. It is to be understood, however, that the drawings are for the purpose of illustration only and are not to be taken as a definition of the scope of the invention, reference being had for this purpose to the appended claims.

In the drawings wherein like reference numerals indicate like parts throughout the several views:

Figure 2 is a sectional view of the instrument of Figure 1;

Figure 3 is a view looking from the left of Figure 1, with the panel removed showing the indicating and totaling mechanism;

Figure 4 is a partial view similar to Figure 3 showing the setting and calibrating adjustments;

Figure 5 is an operating diagram of the connecting linkage of Figure 1;

Figure 6 is a perspective view of the recording and totaling mechanism;

Figure 14:
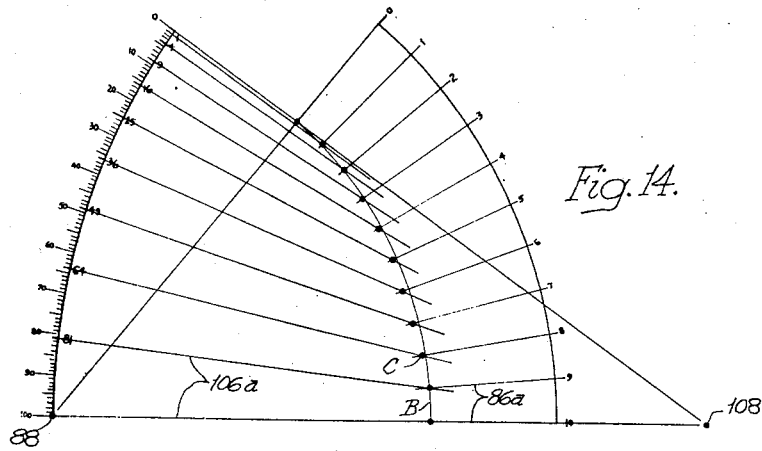
Figure 12:
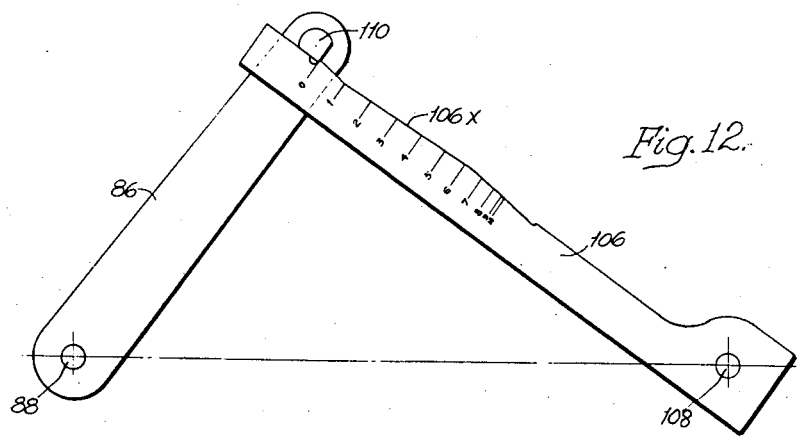
Figure 13:
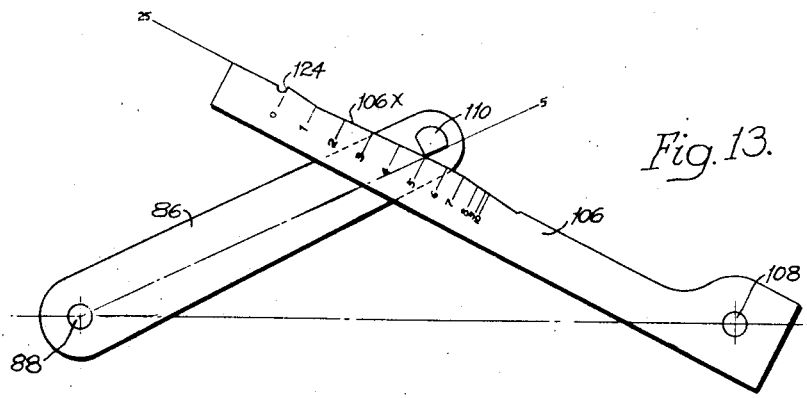

Figures 7, 8, and 9 are views showing different positions of a portion of the linkage of Figure 6;

Figure 10 is an elevation of a modified indicating linkage;

Figure 11 is a front view of a dial for use with the linkage of Figure 10;

Figures 12 and 13 are views showing two interengaging parts of the mechanism in different positions; and Figure 14 is a diagram illustrating the designing of a square-root cam on one of the parts in Figures 12 and 13.

Referring more particularly to the drawings there is shown therein a flow meter embodying the invention constituted by a high pressure chamber 20 and a low pressure chamber 22 connected at their lower portions to form a U-tube. The chambers are adapted to contain mercury and a suitable drain plug 24 may be provided to remove the mercury therefrom. The low pressure chamber 22 is preferably detachably connected so that different sized chambers can be substituted to provide for different pressure ranges.

The high pressure chamber 20 is connected by a pipe 26 with the high pressure side of an orifice in a conduit (not shown) the flow through which is to be measured and chamber 22 is connected by a pipe 28 with the low pressure side of the orifice. In this way the mercury level in the chambers is caused to vary in accordance with variations in the flow in a manner well understood in the art. If desired a valve controlled connection 30 may be provided between pipes 26 and 28 to equalize the pressure on the chambers and permit calibration of the instrument without interrupting flow through the conduit.

A float 32 rests on the mercury in the high pressure chamber and is connected to a rotatable shaft 34 by a lever 36 pivoted to the float. The shaft 34 extends out through the chamber 20 through a seal 38 which is packed with grease and is held in place by a gland nut 40. A suitable thrust bearing 42 is provided for taking the end thrust on the shaft.

Outside of the chamber, a lever 44 is secured to shaft 34 and a bell crank lever 46 is pivoted thereon adjacent lever 44. The end of lever 44 and one end of bell crank lever 46 are connected by a screw adjustment 48 carried by suitable flanges on the bell crank lever and threaded through a part 50 rotatably carried by lever 44. By this construction the relative positions of levers 44 and 46 can be adjusted to set the instrument at zero, by manipulation of adjustment 48 by means such as a screw driver 49.

The other end of bell crank lever 46 is provided with a slot 52. A shaft 54 is rotatably mounted adjacent the bell crank lever and has secured thereto through a novel adjustable connection a lever 56 carrying a pin 58 which is slidable in slot 52. Lever 56 has a slot therein through which shaft 54 passes and is provided with suitable flanges rotatably carrying a screw 60 which is threaded through shaft 54. By this means the effective length of lever 56 can be adjusted and a simple calibration adjustment is provided for the instrument.

A lever 62 is secured to shaft 54 and this lever is connected through an adjustable screw connection 64 with a stub lever 66 which is pivoted on the shaft. A pen arm 68 is adapted to be secured to lever 66 for cooperation with a suitable record chart.

If desired arm 68 may be used as an instantaneous indicator, but preferably a pointer 70 (Fig. 3) is pivoted at any suitable point and connected by a link 72 with a third lever 74 secured to shaft 54.

A totaling mechanism of the type disclosed and claimed in my copending application Serial No. 135,041, filed April 5, 1937, which is a division of this case, is preferably provided to show the total amount of fluid flow over a period of time and as shown such mechanism is constituted by a suitable cyclometer or other counter mechanism 76. Power means shown as an electric motor 78 is provided for periodically operating the totaling mechanism through a crank 80 having a crank pin 82 for operation in a slot in the end of a link 84. As the crank rotates, pin 82 engages the end of the slot in link 84 to pull the same downwardly into the position of Figures 6, 7, and 8 and on further rotation the pin moves up to the position of Figure 9 in which link 84 is released and permitted to move upwardly. Link 84 is connected at its upper end to one arm of a bell crank lever 86 which is pivoted on a fixed shaft 88. A spring 90 is connected to the bell crank lever urging it constantly in a clockwise direction.

A lever 92 is pivoted on shaft 88 and is connected to bell crank lever 86 for rotation therewith. A second lever 94 is also pivoted on shaft 88 and is provided with flanges 96 between which the end of lever 92 is located, thus forming a lost-motion connection between the two levers. Preferably a screw 98 is screwed through one of the flanges so that the amount of lost motion between the levers and the point at which they become drivably connected can be adjusted.

Lever 94 carries a suitable one-way drive connection 100 shown as of the type disclosed and claimed in the copending application of George W. Grisdale, Serial No. 2,649, filed January 21, 1935, now Patent 2,074,585, granted March 23, 1937. This connection 100 is constituted by a notched lever mounted on a leaf spring which is secured to lever 94 and so arranged that the notch will bind on a flange 102 on a gear wheel 104 when the lever 94 moves in one direction but not when it moves in the other. Thus gear wheel 104 will be driven in one direction and drives the counter 76 through suitable gearing indicated in part in Figure 6.

The above mechanism causes bell crank lever 86 to oscillate periodically about its pivot as illustrated in Figures 7, 8, and 9, to drive levers 92 and 94 and the counter. The degree of oscillation of the bell crank is controlled by a novel square-root cam lever 106 mounted for pivotal movement about a shaft 108 and having on one edge a square-root cam surface to be engaged by a pin 110 carried by lever 86. The position of the cam lever is controlled according to the position of lever 56 by an arm 112 rigid with lever 56 and a connecting link 114. The link 114 is pivoted to a lever 116 pivoted on shaft 108 and yieldingly connected by a coil spring 118 with a lever 120 having an elongated pin 122 engaging both lever 116 and the cam lever 106. Spring 118 is extended to engage the cam lever so that both the cam lever 106 and lever 116 are yieldingly connected to lever 120 and are yieldingly connected together.

The cam lever is preferably provided with a shoulder stop 124 adjacent its end corresponding to zero so that when the cam lever is in its zero position pin 110 will engage shoulder 124 and will be prevented from turning. The cam lever also has an extension carrying an arcuate sector 126 which is adapted to be engaged by a brake 128 to hold the cam lever stationary. The brake is urged into engagement with the sector 126 by any suitable spring (not shown) and is forced out of engagement by operation of the crank 80 which is cam-shaped and engages a suitable cam roller carried by the brake.

If it is desired to form a permanent record of the flow measurements, a rotatable shaft 130 may be connected through suitable gearing 132 with the motor 78 for driving a chart (not shown) across which pen arm 68 swings.

As shown in Figures 12—14, the lever 106 has a novel cam surface $106^x$ engaged by the pin 110 in such a manner that angular movements of arm 86 are proportional to the square roots of the movements of lever 106, and are therefore proportional to the square root of the differential pressures measured by float 32, and therefore are directly proportional to the flow being measured.

Figure 14 illustrates one method of laying out the contour of the cam surface $106^x$. In this figure, lines $106^a$ represent different angular positions of arm 106 proportional to various uniform changes in flows, from 1 to 10 (on any arbitrary scale), and therefore represent angular positions on a uniformly-graduated scale (shown for purposes of illustration as graduated from zero to 100) equal to the squares of those flows, or equal to the differential pressures measured by the float 32. Lines $86a$ represent ten equally angularly spaced positions of the arm 86.

The dots "C" represent the intersections of lines $86a$ with lines $106a$, and therefore represent the positions at which pin 110 should engage the edge of lever 106 to give equal spacings of arm 86 for equal changes in flow (i. e. for equal changes in the square roots of the differential pressures). "B" is a circular arc struck about the axis of shaft 88, and therefore represents what would be a straight-edge on the cam surface $106^x$.

The surface $106^x$ is readily plotted from the positions of intersections "C". By comparing the positions of these intersections in Figure 14 with the curve "B", it will be seen that the surface $106^x$, while not a straight line, is much more nearly so than in square-root cams previously used in meters and other instruments of this type. This facilitates accurate manufacture at low cost, as the cam may be formed by a simple blanking or shearing operation.

In operation of the measuring instrument so far described, as flow through the conduit varies, the mercury level in chamber 20 will vary, causing the float to rise and fall. This rotates shaft 34 swinging lever 46 and also lever 56 through the pin and slot connection therebetween. It will be noted that any irregularity of rotation of shaft 34 due to varying angularity of link 36 is compensated for by calibration, by changing the relative lengths of levers 46 and 56 so that angular movement of lever 56 is always substantially directly proportional to the float travel. The zero adjustment 50 enables the relative angular positions of shaft 34 and lever 46 to be adjusted so that the indicating mechanism can be set at zero regardless of slight variations in the mercury level without affecting the accuracy of the instrument.

Pivotal movement of lever 56 rotates shaft 54 and swings pen arm 68 so that its position is always directly dependent on the float position and flow through the conduit, the pen making a permanent record on its associated chart in a manner well understood in the art. The calibration adjustment 60 enables the effective length of lever 56 to be adjusted to produce different degrees of angular movement thereof for the same movement of lever 46. This enables accurate calibration of the instrument regardless of inaccuracies in the bores of chambers 20 and 22 and eliminates the necessity for extreme accuracy in the manufacture of these chambers.

Referring to Figure 5 there is shown a diagrammatic view of the calibration by adjustment 60. In this view the ranges of float travel marked maximum, normal and minimum produce angular movements of lever 46 similarly designated. Three positions of pin 58 to give substantially equal or constant angular movements of lever 56 for these ranges of movement are also indicated from which it will be apparent that screw 60 permits accurate calibration of the instrument for different ranges of movement of the float produced by inaccuracies in the size of the pressure chambers.

Rotation of shaft 54 also rocks lever 74 which swings pointer 70 across an associated dial through link 72 to indicate the instantaneous flow.

As lever 56 moves, it rocks lever 116 and, through the yielding connection 118—120, the cam lever 106. The cam lever is held by brake 128 except when the crank cam 80 is in the position of Figures 6, 7, and 8, spring 118 yielding to permit movement of lever 116 in either direction when the cam lever is locked. As crank 80 rotates brake 128 is periodically locked and released and link 84 pulled down and released to raise bell crank lever 86 and release it for swinging movement under the influence of spring 90. Figure 7 shows the zero position of the cam lever with lever 86 raised by the crank, and with brake 128 released, and Figure 8 shows a similar position with the cam lever swung around to a position corresponding substantially to maximum flow. Figure 9 shows the position of the parts after crank 80 has turned through substantially 180° from the position shown in Figure 8 with brake 128 engaging sector 126, crank pin 82 loose in the slot in link 84 and bell crank 86 swung around under the influence of spring 90 until pin 110 is in contact with the cam lever. Thus the force of pin 110 striking the cam lever is taken by the brake rather than the operating linkage and the linkage is free to move through yielding of spring 118. It will be noted from Figures 6, 7, and 8 that the pin 110 is raised above the zero shoulder, on the cam lever, the distance between the pin and shoulder constituting lost motion to insure that the brake is engaged before the pin strikes the cam lever.

From the above it will be apparent that the amount of movement of lever 86 is dependent on the position of the cam lever 106 which is so formed and controlled as to limit the movement of lever 86 to be proportional to the flow through the conduit, i. e. to the square root of the differential of the pressures. As lever 86 and lever 92 which is connected thereto are oscillated, lever 94 will also be oscillated. The lost motion between levers 92 and 94 corresponds to the lost motion between shoulder 124 and the upper position of pin 110 so that lever 94 will be moved only after pin 110 has passed its zero position at shoulder 124.

As lever 94 oscillates in a clockwise direction the notched lever slides over flange 102 but as it oscillates in a counterclockwise direction the notch grips the flange and rotates gear 104. This gear operates the counter which is so graduated as to indicate the total flow in pounds, cubic feet or other desired units. The gearing is so proportioned that each movement of lever 86 turns up on the counter an amount equal to the flow for which cam lever 106 is set times the length of time required for crank 80 to make one revolution, say fifteen seconds. Thus the counter gives an accurate indication of the total flow through the conduit over a period of time. If desired a suitable one-way holding device 105 (Figure 3), described in the above-mentioned Grisdale application, may be provided for preventing reverse rotation of gear 104 under the influence of friction when arm 94 is moving in a clockwise direction.

Figure 1:
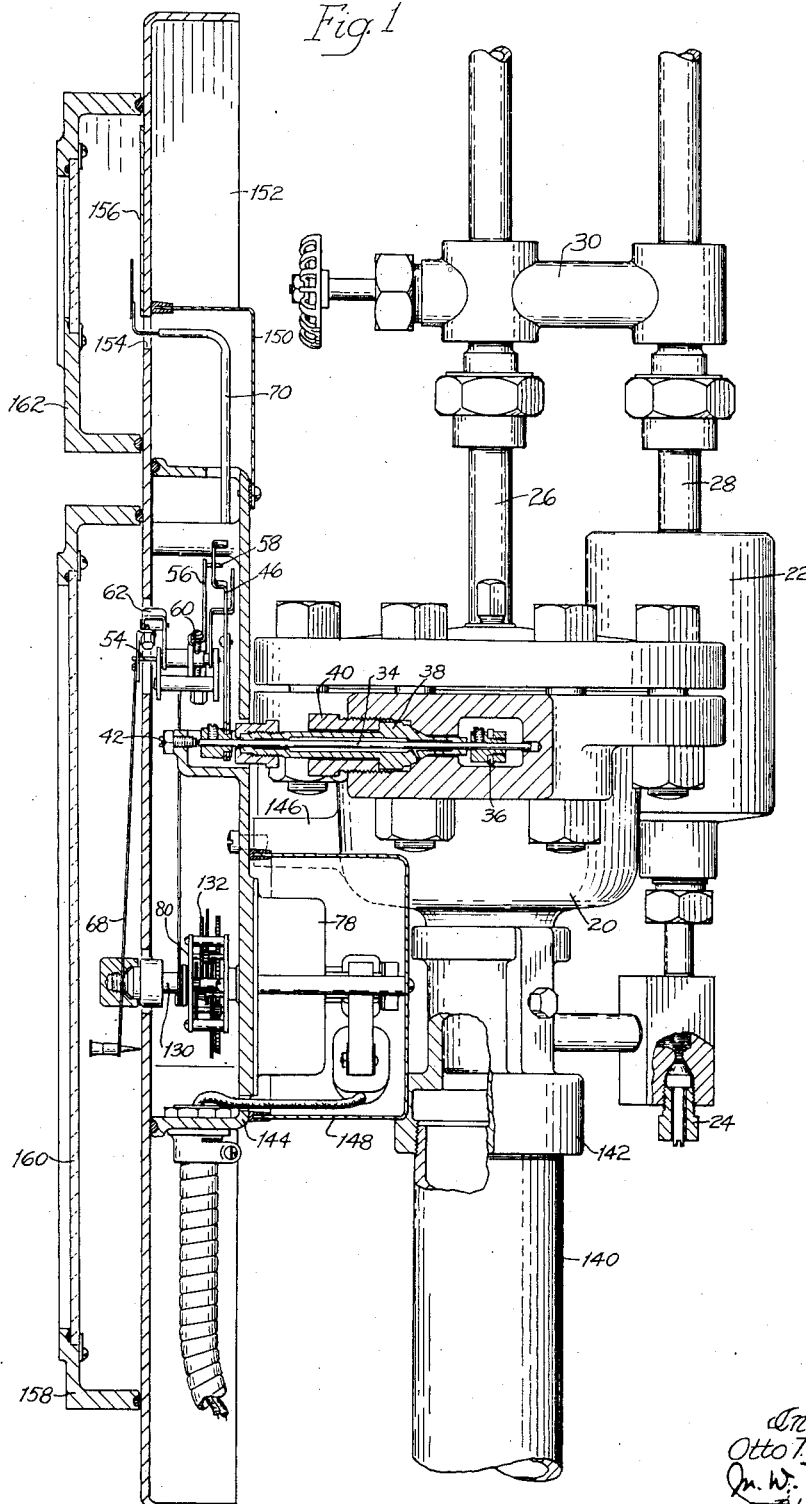
Figure 1 is a view with parts in section and parts in elevation of an instrument embodying the invention.

A novel mounting means is provided according to the invention and as shown in Figures 1 and 2 is constituted by a single upright support 140 which may conveniently take the form of a pipe to the upper end of which chamber 20 is secured by a bracket 142. A cup-shaped housing 144 is secured to lugs 146 formed integral with or otherwise secured to chamber 20 and the indicating, recording and totaling mechanism described above is mounted in this housing. The electric motor 78 is preferably enclosed in a separate cup-shaped housing 148 secured to the rear face of housing 144 and having a suitable sealing gasket of rubber or like material around its edge to form a tight seal. Also if desired pointer 70 may extend through a slot in the housing 144 and a separate supplemental housing 150 may be provided to enclose it.

The open ends of housings 144 and 150 are closed by a suitable panel 152 which rests on the edges thereof, suitable rubber sealing gaskets being provided to form a tight seal therebetween. Pointer 70 extends through a slot 154 in panel 152 and moves across a scale 156 on the front face thereof and the operating mechanism for pen arm 68 also extends through the panel, the pen arm being mounted on the front face thereof to cooperate with a suitable chart (not shown) carried by shaft 130 in front of the panel. The counter 76 is preferably mounted in the housing 144 and can be read through suitable openings in the panel 152.

A cover 158 having a rubber sealing gasket around its periphery is secured over the panel 152 to enclose the mechanism on the front of the panel and has a transparent front such as a glass plate 160 through which movements of the indicating, recording and totaling mechanism can be observed. Preferably a separate cover 162 is provided for pointer 70 and its scale, but if desired these parts can also be enclosed by cover 158.

A small removable plate 145 is preferably secured to the upper part of housing 144 to permit insertion of a screw driver or the like when removed as indicated in Figure 4, to set the zero and calibration adjustments.

Figures 10 and 11 show a modification of the indicating mechanism in which no permanent record is made and in which movement of the indicating pointer is amplified to facilitate reading. Parts in these figures corresponding to similar parts in the other figures are designated by the same reference numerals plus 200. In this modification as lever 256 moves it rocks a lever 257 about a shaft 259. Lever 257 is secured to a gear segment 261 which meshes with a small pinion 263 so that small angular movement of the segment will produce a large angular movement of the pinion. Pinion 263 is secured to a shaft which extends through a panel 352 and carries in front of the panel a pointer 270 which cooperates with a scale 356 on the panel. It will be noted from Figure 11 that the scale 356 extends through an angle of about 270° so that the graduations are large and it is easy to read.

From the above it will be seen that the present invention provides a novel measuring instrument which is simple and reliable in construction and operation, which is extremely accurate throughout its entire range and which can be readily adjusted and calibrated. The recording mechanism provides a permanent record of flow conditions where desired and the totaling mechanism provides a simple and reliable means for showing the total flow over a period of time.

The novel mounting is particularly applicable to the flowmeter described but it will be apparent that many other types of instruments might be mounted thereon. This arrangement provides an extremely simple unitary mounting for an instrument.

It will be understood that many changes might be made in the form shown without departing from the invention and it is not intended that the scope of the invention shall be limited other than by the terms of the appended claims.

I claim:

1. An instrument for measuring the flow of fluid through a conduit comprising a chamber containing a column of mercury, connections between said chamber and conduit whereby the mercury level will fluctuate with flow rate changes in the conduit, a float in said chamber, linkage connected to the float and so constructed and arranged that equal increments of movement of the float will produce equal increments of movement of the linkage, totaling mechanism including a rotatable member adapted to rotate in one direction only, an oscillating lever for rotating said member, power means for periodically oscillating said lever and a second set of linkage connected to said first linkage and including a member moved thereby proportionally to the existing rate of flow, said member lying in the path of movement of said lever to limit its oscillating movement proportionally to the existing rate of flow.

2. In a measuring instrument having a member movable in accordance with changes in a condition to be measured, a shaft adapted to be driven by said member, a lever mounted on said shaft, a slidable driving connection between said member and lever, and adjustable means mounting the lever on the shaft whereby the effective length of the lever can be adjusted to calibrate the instrument.

3. In a measuring instrument having a member movable in accordance with changes in a condition to be measured, a shaft adapted to be driven by said member, a lever mounted on said shaft, a slidable driving connection between said member and lever, indicating mechanism driven by said shaft, and an adjustable screw connection between said lever and shaft whereby the effective length of the lever can be adjusted.

4. In a measuring instrument having a member movable in accordance with changes in a condition to be measured, a shaft adapted to be driven by said member, a lever mounted on said shaft, a slidable driving connection between said member and lever, totaling mechanism connected to said lever to be controlled thereby and a screw connection between said lever and said shaft to adjust the effective length of the lever.

5. A measuring instrument comprising a chamber containing a column of mercury whose level fluctuates in response to variations in a condition to be measured, a float in said chamber, a shaft connected to said float to be rotated thereby, a lever carried by said shaft, a second shaft, a second lever, means adjustably mounting the second lever on the second shaft so that its effective length can be varied to calibrate the instrument, and a pin and slot connection between said levers whereby the second lever and second shaft will be driven by the first-named lever.

OTTO T. HANDWERK.